United States Patent [19]

Svendsen

[11] 3,857,986

[45] Dec. 31, 1974

[54] METHOD OF PREPARING A PACKAGED HEAT STERILIZED MINCED MEAT PRODUCT

[75] Inventor: Svend Anker Svendsen, Hvalso, Denmark

[73] Assignee: Slagteriernes Forskningsinstitut, Roskilde, Denmark

[22] Filed: Nov. 8, 1972

[21] Appl. No.: 304,798

[30] Foreign Application Priority Data
Nov. 8, 1971 Denmark .......................... 15356/71

[52] U.S. Cl. ................. 426/371, 426/342, 426/382, 426/407
[51] Int. Cl. ........................................... A22c 18/00
[58] Field of Search ............ 99/107, 108, 109, 159, 99/187; 426/231, 371, 382, 342, 407

[56] References Cited
UNITED STATES PATENTS

| | | | |
|---|---|---|---|
| 2,899,311 | 8/1959 | Zick | 99/108 |
| 3,033,687 | 5/1962 | Harper et al. | 99/109 |
| 3,050,399 | 8/1962 | Kielsmeier et al. | 99/109 |
| 3,573,062 | 3/1971 | Paynter et al. | 99/107 |

*Primary Examiner*—Hyman Lord
*Attorney, Agent, or Firm*—Waters, Roditi, Schwartz & Nissen

[57] ABSTRACT

An improved minced meat product is obtained by (a) chopping a meat into individual pieces the ratio of whose volume to surface area is less than or equal to 1, (b) curing the pieces with a salt material such as sodium chloride, (c) adjusting the fat content of the cured pieces to one of between 12–20 percent, (d) mincing the cured meat of adjusted fat content to form a minced binder component, (e) mincing a coarse component, and (f) mixing both minced components while maintaining their temperature below 22°C. This method avoids denaturation of the meat proteins and separation of jelly and fat from the meat, and also enables subsequent preservation at unusually high temperatures.

4 Claims, No Drawings

METHOD OF PREPARING A PACKAGED HEAT STERILIZED MINCED MEAT PRODUCT

This invention relates to a method of preparing a minced meat product in which the meat is chopped, salted and minced and which comprises a binder mince component and a coarse mince component.

It is known to produce minced meat products such as luncheon meat by a chopping, mincing and salting procedure followed by packaging and heat treating steps. The known methods of this type normally use a salt mixture comprising sodium chloride and minor amounts of other salts such as nitrates and nitrites. It is customary to make a so-called binder mince and a so-called coarse mince in high-speed cutters on which the components are mixed, deposited in tins and preserved by heating to the desired preservation temperature.

The object of the said heat treatment is to destroy all pathogenic bacteria and other microorganisms, such as Clostridium botulinum. In the known methods of treating meat is was not possible to subject the minced meat to temperatures substantially above 180°C, because higher temperatures would impair the quality of the meat. The cause probably is that the known treatments involved denaturation of part of the proteins contained in the binder mince and poor utilization of the salt and water soluble proteins in the meat whereby its binding power and consistency would be impaired or destroyed.

It was also previously regarded as necessary to carry out the curing of the meat with a salt mixture containing nitrite to obtain a satisfactory preservation.

The present invention is based on the realization that by adopting specific measures in the curing and mincing steps it will be possible to avoid denaturation of the proteins so that the binder mince retains its binding power. This has been accomplished by the method according to the invention, which is characterized in that the meat is chopped into pieces of such dimensions in cms that the ratio of volume to total surface area of the individual meat pieces is less than or equal to 1, and that the pieces are cured with from 20 to 40 grs of salt or salt mixture to one kg meat, on which the binder component is adjusted to a fat percentage of from 12 to 20 and minced in a high-speed cutter for 2-3 minutes. The coarse component is minced and mixed with the binder mince while the temperature of both components is maintained below 22°C, whereafter the mix is packaged and preserved.

The application of all the aforesaid measures results surprisingly in the avoidance of the denaturation of the proteins that impairs the quality of the minced meat, besides which the subsequent preservation may be carried out by heat treatment at relatively high temperatures, for instance 122°C or above. It has also been found that the curing mixture may contain smaller amounts of nitrite than normal or that the use of nitrite may even be dispensed with altogether.

In the known methods high temperatures are attended with the drawback that jelly separates from the meat, whereby the quality of the product is seriously reduced. It has been found, however, that in the method according to the invention it is possible to keep the jelly percentage below 7 and to eliminate fat separation even where the preservation is carried out at extremely high temperatures.

A minced meat product of particularly high quality will be obtained according to the invention if the meat is chopped to pieces of which the said ratio of volume to surface area is above 0.3 and preferably within the range of 0.5–0.8. The curing may advantageously be carried out according to the invention with an amount of salt or salt mixture of from 24 to 30 grs to one kg meat, depending on the type of meat and the composition of the mixture. If the fat content of the binder component is adjusted to 14–18 percent, a particularly high binding power will be obtained. Though the method of the invention can be applied with advantage at temperatures up to 22°C (room temperature) it is often preferred to keep the temperature of the components below 10°C during treatment.

It has moreover been found that the said method can be applied with advantage to several types of meat, such as pork, veal, beef, mutton, or mixtures thereof. Specifically, the present invention provides, in a method of preparing a minced meat product wherein meat is chopped, salted, and minced to form a binder mince component and a coarse mince component and the two are mixed, the improvement comprising (a) chopping the meat into pieces of such dimensions in cms that the ratio of volume to surface area of the individual pieces is less than or equal to 1, (b) mixing said pieces with from 20 to 40 grs of sodium chloride to one kg meat, and (c) adjusting the fat content of the meat to between 12 and 20 percent, (d) mincing the meat with its adjusted fat content in a high-speed cutter for 2-3 minutes to form a minced binder component, (e) mincing a coarse component, and (f) mixing the minced coarse component with the minced binder component while maintaining the temperature of the minced components below 22°C.

The method according to the invention will be illustrated by the following examples.

EXAMPLE 1

100 kgs of fresh pork trimmings with a fat content of about 15 percent was chopped to pieces of about 4 cm. These pieces were introduced in a mixer and mixed for about 6 minutes. From the mixed product a sample was drawn to determine the fat content, whereafter fat or lean meat of known fat percentage cut to 4 cm pieces were added to adjust the fat content to 15 percent. The mixer was started again, 2.8 kgs of salt added and the mixing continued for 10 minutes, after which the product (raw material I) was placed in cool storage at 4°C. The same procedure was followed with pork trimmings containing 20 percent of fat (raw material II) and pork trimmings containing 50 percent of fat (raw material III).

The products were allowed to stand for 24 hours. Then 37.2 kgs of raw material I was withdrawn and fed to a high-speed cutter, which was started and 3 percent of water calculated on the total amount of meat was added together with seasoning. The cutter was then operated at top speed for 2.5 minutes to produce a binder mince. To this binder mince was added a coarse mince consisting of 22 kgs of raw material II and 35 kgs of raw material III, both of which had been forced through 5 mm perforated discs. The whole was mixed thoroughly in the cutter and finally the mix was evacuated for about one minute and then fed to a machine to be filled into tins holding 12 ounces each. The filled and sealed tins were preserved for 100 minutes at 121°C.

Despite the high preservation temperature the finished product was of a very high quality both with respect to flavour, aroma, consistency, appearance and jelly separation.

EXAMPLE 2

The procedure of Example 1 was repeated, but instead of pork trimmings a mixture of pork and beef trimmings in a proportion of 4:1 was used.

What I claim is:

1. In a method of preparing a packed, heat sterilized mince meat product wherein the meat is salted with salt and minced to form a binder mince component and a coarse mince component and the two are mixed, packed and heat sterilized at high temperatures, the improvement comprising the following steps:
    a. chopping the meat before salting into pieces of such dimensions in cms that the ratio of volume to total surface area of the individual meat pieces is less than or equal to 1
    b. mixing the chopped meat pieces with from 20 to 40 gms of salt to one kg meat,
    c. separating the chopped salted meat into a first and a second portion,
    d. mincing the first portion of meat in a high-speed cutter for 2–3 minutes and adjusting the fat content of the meat to between 12 and 20 percent to form a binder mince component,
    e. mincing the second portion of meat from step (c) to form a coarse mince component,
    f. mixing the coarse component with the minced binder component, the temperature of the meat during steps (a) – (f) being maintained below 22°C,
    g. packaging the minced meat product, and
    h. heat treating the packed meat product to a sterilizing temperature above 108°C.

2. A method according to claim 1 wherein in step (a) the ratio is between 0.5 cms and 0.8 cms.

3. A method according to claim 1 wherein in step (d) the fat content is adjusted to between 14 and 18 percent.

4. A method according to claim 1 wherein step(h) is carried out at about 121°C for 100 minutes.

* * * * *